US008909223B2

United States Patent
Abhishek et al.

(10) Patent No.: US 8,909,223 B2
(45) Date of Patent: Dec. 9, 2014

(54) MULTICAST OPTIMIZATION AND AGGREGATION IN AN ENTERPRISE CONTROLLER

(75) Inventors: Allaukik Abhishek, Irving, TX (US); Rajesh Pazhyannur, Sunnyvale, CA (US); Mark Grayson, Berkshire (GB); Daniel Wee, Garland, TX (US); Santhalingam Balasekar, Plano, TX (US); Hang Jin, Plano, TX (US); Malcolm Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 448 days.

(21) Appl. No.: 13/016,920

(22) Filed: Jan. 28, 2011

(65) Prior Publication Data
US 2012/0196594 A1 Aug. 2, 2012

(51) Int. Cl.
*H04W 60/00* (2009.01)
*H04W 24/02* (2009.01)
*H04W 84/04* (2009.01)
*H04L 12/18* (2006.01)
*H04W 4/06* (2009.01)

(52) U.S. Cl.
CPC ............ *H04W 24/02* (2013.01); *H04W 84/045* (2013.01); *H04L 12/189* (2013.01); *H04W 4/06* (2013.01); *H04L 12/1836* (2013.01)
USPC .................. 455/435.1; 455/435.2; 455/435.3; 455/422.1; 455/406; 455/410

(58) Field of Classification Search
USPC ................... 455/446, 449, 435.1–435.3, 406, 455/410–411
See application file for complete search history.

(56) References Cited

U.S. PATENT DOCUMENTS

| 7,995,994 B2 * | 8/2011 | Khetawat et al. .............. 455/410 |
| 2008/0076420 A1 * | 3/2008 | Khetawat et al. .......... 455/435.1 |
| 2008/0305792 A1 * | 12/2008 | Khetawat et al. .......... 455/435.1 |
| 2009/0264126 A1 * | 10/2009 | Khetawat et al. .......... 455/435.1 |
| 2009/0265543 A1 * | 10/2009 | Khetawat et al. .............. 713/151 |
| 2010/0041402 A1 * | 2/2010 | Gallagher et al. .......... 455/435.1 |
| 2010/0214977 A1 * | 8/2010 | Hegde ........................... 370/328 |

OTHER PUBLICATIONS

Andy Germano, "Shrinking the Network: Is a Network of Million Femtocells a Possibility", ATIS Technology Conference at Supercomm, Oct. 21, 2009.

* cited by examiner

*Primary Examiner* — Michael T Vu
(74) *Attorney, Agent, or Firm* — Edell, Shapiro & Finnan, LLC

(57) ABSTRACT

A method and apparatus are provided for managing radio access point (RAP) devices and enterprise controller devices in a wireless communication network. An enterprise controller device registers with a gateway device, and the enterprise controller device receives a registration request from multiple RAP devices that are serviced by the enterprise controller device. As the RAP devices register with the enterprise controller device, the enterprise controller device generates a list of the RAP devices registered with the enterprise controller. As the enterprise controller receives additional registration requests from additional RAP devices, the enterprise controller updates the list. The enterprise controller sends the list to the gateway device with which it registers so that the gateway device is aware of RAP devices serviced by the enterprise controller device. In this way, aggregated messages may be sent from the gateway device to the enterprise controller.

17 Claims, 13 Drawing Sheets

FIG. 6B

| Input Parameter | Message Type | EFC ID | RAP ID | RAP Location Information | PLMN-ID | Cell-ID | LAC, RAC, SAC | CSG-ID | RAP Cell Access Mode |
|---|---|---|---|---|---|---|---|---|---|
| Format/Type | RAP ADD REQ | EFC ID (EFC Represents the RAP) | Identify the RAP being added | Location Information as per SP Req. | Operator ID including MCC, MNC | 28 bit ID of Cell within PLMN | PLMN assigned identities | 27 bit ID | Closed, Hybrid, Open |

620(b) | 620(a)

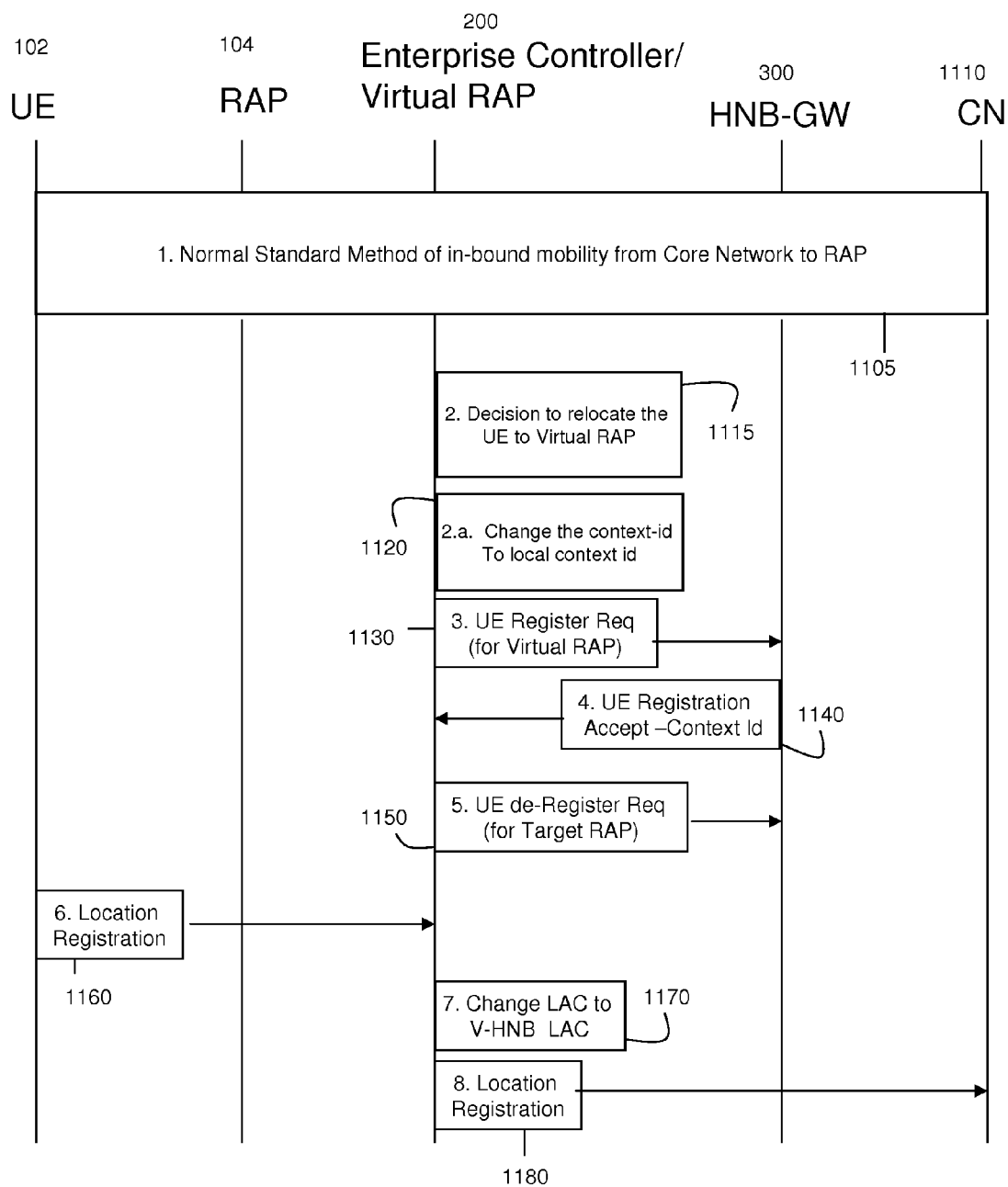

MULTICAST OPTIMIZATION AND AGGREGATION IN AN ENTERPRISE CONTROLLER

TECHNICAL FIELD

The present disclosure relates to wireless mobile communication infrastructure extensions and deployments.

BACKGROUND

Femtocell access point devices are radio access point devices that are deployed at subscriber sites in order to improve coverage of mobile wireless communication service (e.g., cell phone, wireless messaging, etc.) and thereby offload the burden on the infrastructure of the mobile service provider. Picocell access point devices operate substantially similarly to femtocell access point devices, but are typically more powerful and support more channels than femtocell access point devices. Both access point devices, as well as other like access point devices (referred to herein as "radio access point devices" or "RAPs") function, essentially, as cellular (or "cell") transceiver towers. Like cell towers, RAPs operate in a licensed spectrum that is subject to strict regulatory constraints on service providers.

Increasingly, RAPs are being deployed by enterprises, such as large corporations that want to extend mobile communication capabilities inside their own buildings and other facilities where conventional cellular tower service (also referred to herein as "macro" service) might not be available or less desirable from a cost perspective. Oftentimes RAPs are open access, allowing any cellular user (enterprise user or non-enterprise user) user access to the infrastructure.

BRIEF DESCRIPTION OF THE DRAWINGS

FIG. 6B shows an example of a message received at the HNB gateway device that uniquely identifies the enterprise controller device and the RAP devices that are registered with the enterprise controller device.

FIG. 11 shows a sequence diagram depicting steps for relocating user equipment devices to a virtual RAP device.

DESCRIPTION OF EXAMPLE EMBODIMENTS

Overview

In one embodiment, a method and apparatus is provided for managing radio access point (RAP) devices and enterprise controller devices in a wireless communication network. An enterprise controller device registers with a gateway device, and the enterprise controller device receives a registration request from a first RAP device and a second RAP device that are serviced by the enterprise controller device. As the first and second RAP devices register with the enterprise controller device, the enterprise controller device generates a first data map that comprises a list of the first and second RAP devices registered with the enterprise controller. As the enterprise controller receives additional registration requests from additional RAP devices, the enterprise controller updates the list in the first data map. The enterprise controller then sends the first data map to the gateway device with which it registers so that the gateway device is aware of RAP devices that are serviced by the enterprise controller device. The gateway device, thus, can send messages destined for multiple user equipment devices managed by the first and second RAP devices by sending aggregated messages to the enterprise controller.

In a second embodiment, the enterprise controller device signals to the gateway device that a first and second user equipment (UE) device, managed by respective first and second radio access point (RAP) devices, are relocated to a third RAP device. In this embodiment, the enterprise controller device receives a first registration request from a first UE device and a second registration request from a second UE device. The first UE device and second UE device are managed by respective first and second RAP devices. The enterprise controller device forwards the first and second registration requests to the gateway device and, subsequently, signals to the gateway device that the first and second UE devices are relocating to a third RAP device without the first and second UE devices having sent registration requests for such relocating. The enterprise controller itself may act as the third RAP device. The gateway device, thus, can send messages destined for the first UE device and second UE device by sending aggregated messages to the third RAP device (e.g., the enterprise controller).

Example Embodiments

Figure 1:
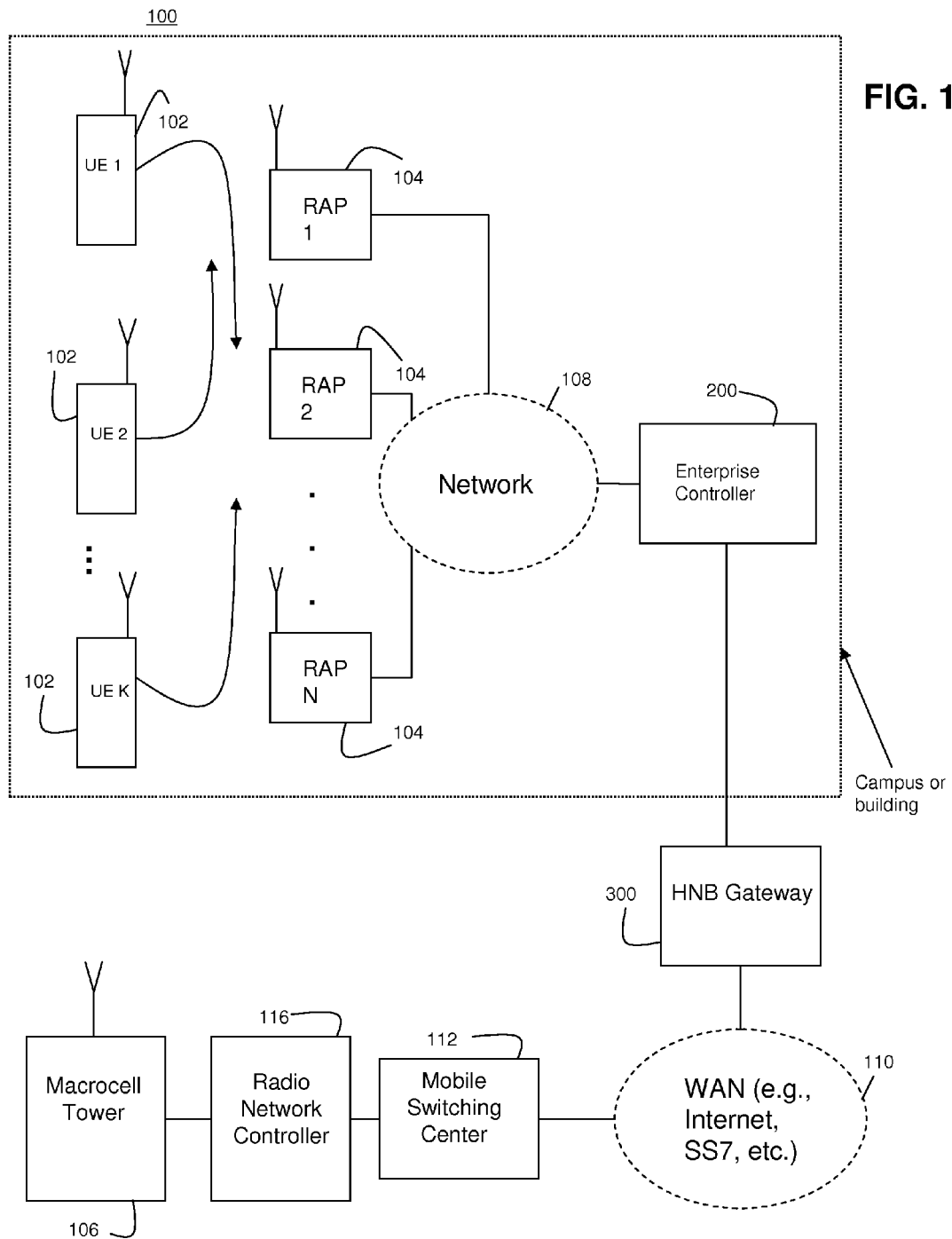
FIG. 1 shows an example of a wireless communication network featuring an enterprise controller configured to service a plurality of radio access point (RAP) devices and to map messages to appropriate RAP devices that are serviced by the enterprise controller device.

FIG. 1 shows an example wireless communication network 100 featuring an enterprise controller device 200 configured to service a plurality of radio access point (RAP) devices 104 (e.g., RAP 1 to RAP N) and to map messages to the appropriate RAP devices 104 serviced by the enterprise controller device 200. In general, in network 100, a plurality of wireless user equipment (UE) devices 102 wirelessly communicate with a plurality of RAP devices 104 over wireless connections to transmit and receive network traffic. The UEs 102 (e.g., UE 1 to UE K) are also capable of wirelessly communicating with fixed macrocell towers, such as the macrocell tower 106. The UEs 102 may be wireless mobile devices that are configured to use any wireless communication standard now known or hereinafter developed, such as 3G, 4G/Long Term Evolution, etc. The UEs 102 may move about, with movement of users, as indicated by the arrows in FIG. 1. The UEs 102 are configured to connect wirelessly with any of the RAPs 104, and multiple UEs 102 can connect to a given one of the RAPs 104. The UEs 102 can roam between RAPs just like they can roam between different macrocell towers.

The RAPs 104 are connected to enterprise controller 200 over network 108. The enterprise controller apparatus 200 is provided to control or service the RAPs 104 that are deployed for a building or campus. The enterprise controller apparatus 200 is in turn connected to a Home Node B (HNB) gateway apparatus 300. In a given deployment, there may be multiple enterprise controller devices in communication with an HNB gateway apparatus, where each enterprise controller device controls or services designated RAPs. For simplicity, only one such enterprise controller device 200 is shown. Likewise, in a given deployment, there may be multiple HNB gateway devices, where each enterprise controller is assigned to one HNB gateway. For simplicity, only one such HNB gateway device 300 is shown. The HNB gateway 300 communicates with a mobile switching center 112 over a wide area network (WAN) 110 that may include communication via the Internet, Signal System No. 7 telephony signaling, etc. The mobile switching center 112 is provided to handle the direction of traffic to each UE for communication through the appropriate RAP or macrocell tower depending on the current location of the UE. The mobile switching center 112 is also connected to the public switched telephone network (not shown) to, e.g., couple voice calls to UEs 102. The macrocell tower 106 connects to the mobile switching center 112 via a radio network controller 116. Multiple radio network controllers are deployed to support multiple macrocell towers.

As the UEs 102 move from one location to another within network 100, the RAPs 104 may hand over communication with the UEs 102 to one another, thus enabling users of the UEs 102 to experience continuous communication capabilities. RAPs 104 serve as access points for the UEs 102 to the core network (e.g., the mobile switching center 112). The RAPs 104 may be any wireless access point device configured to provide wireless services to a plurality of UEs 102 in a relatively smaller coverage area than a macrocell tower and which are capable of being readily moved from one location to another location (unlike a macrocell tower which is fixed). For example, RAPs 104 may be configured for Femtocell or Picocell deployments in consumer, residential or corporate enterprise environments to provide wireless services to the plurality of UEs 102.

The RAPs 104 are configured to communicate with the enterprise controller 200 via the network 108, and the enterprise controller 200, as described hereinafter, is configured to receive and transmit network traffic and communications, on behalf of one or more UEs 102 from HNB gateway 300. The enterprise controller 200 is also configured to receive and transmit signals to the RAPs 104 across network 108. The HNB gateway 300, as described hereinafter, is configured to receive and transmit network traffic to the mobile switching center 112 across WAN 110. Similarly, the HNB gateway 300 is configured to receive and transmit network traffic to the enterprise controller 200.

In general, inbound communication traffic originating from the mobile switching center 112 that is destined for one or more of the UEs 102 reaches the UEs 102 via the HNB gateway 300. In one embodiment, the enterprise controller 200 registers with the HNB gateway 300, and through this registration process, the HNB gateway 300 is provided with a data map from the enterprise controller 200 that comprises a list of RAPs registered with the enterprise controller 200. As a result, the HNB gateway 300 can transmit inbound communication traffic, in an aggregated fashion, that is destined for one or more of the UEs 102 to the enterprise controller 200 based on the data map.

In another embodiment, the enterprise controller 200 does not register with the HNB gateway 300. Rather, the enterprise controller 200 may signal to the HNB gateway 300 that one or more UEs 102 have relocated to a single RAP device (e.g., a "virtual" RAP device). This single RAP device may be any of the existing RAP devices 104 or may be the enterprise controller device 200 itself. In one example, the UE devices may send registration requests to register directly with the single RAP device. In another example, the UE devices may not actually send registration requests to be relocated to the single RAP device. Rather, in this example, the enterprise controller 200 may send relocation messages that cause the HNB gateway 300 to perceive that the UE devices have been relocated to the single RAP device. In both examples, the HNB gateway 300 can transmit inbound communication traffic, in an aggregated fashion, that is destined for one or more of the UEs 102 to the single RAP device (which may be the enterprise controller device 200). These techniques, among others, are described in further detail herein.

Figure 2:
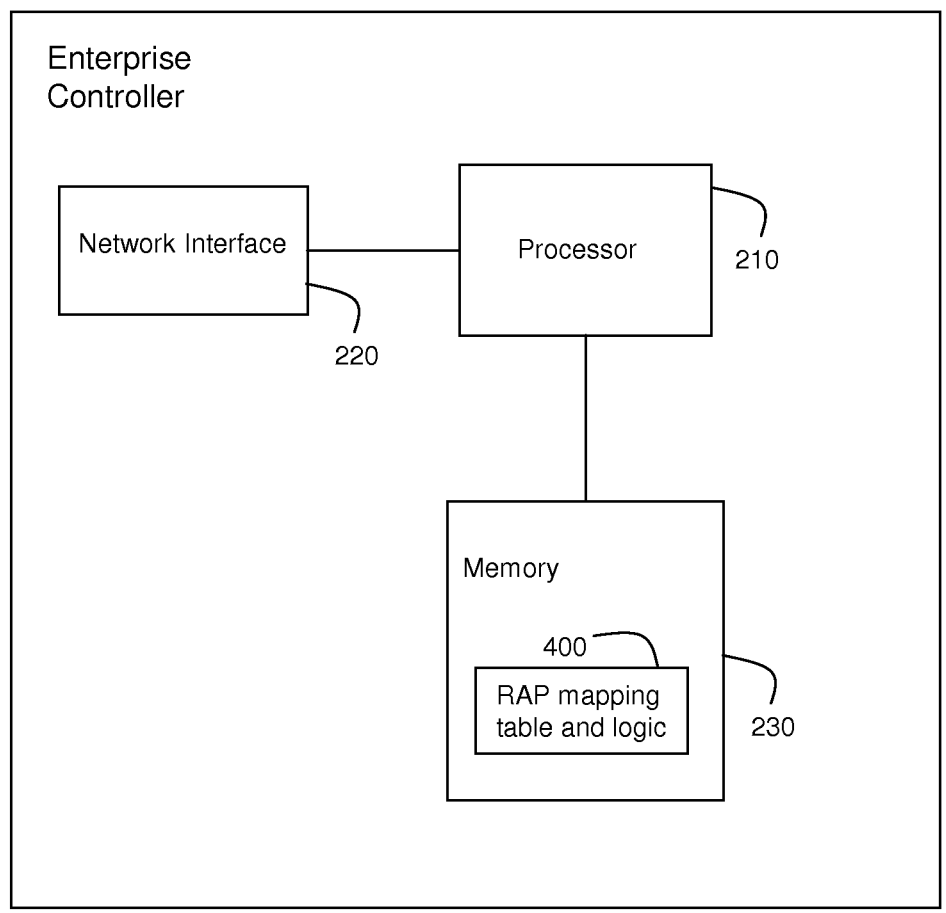
FIG. 2 is an example block diagram of the enterprise controller device that is configured with a RAP mapping table and logic that is used to catalog RAP devices that are serviced by the enterprise controller device and to map messages to appropriate RAP devices.

Turning to FIG. 2, an example block diagram of the enterprise controller 200 device is shown. The enterprise controller device 200 comprises a processor 210 which is coupled to a network interface device 220 and to a memory 230. The processor 210 is configured to cause the network interface device 220 to receive inbound communications (e.g., aggregated messages) from HNB gateway 300 that are destined for the plurality of UEs 102 and to transmit outbound communications that originate from the UEs 102 to HNB gateway 300. Upon receiving the aggregated inbound communications from HNB gateway 300, the processor 210 is configured to cause the network interface device 220 to transmit the inbound communications to appropriate ones of the plurality of RAP devices 104 that manage the plurality of UEs 102 for which the inbound communications are destined, in accordance with the RAP mapping table and logic 400 (described herein) stored in memory 230. Furthermore, upon receiving outbound communications that originate from the UEs 102, the processor 210 is configured to cause the network interface device 220 to transmit the outbound communications to the HNB gateway 300.

Figure 3:
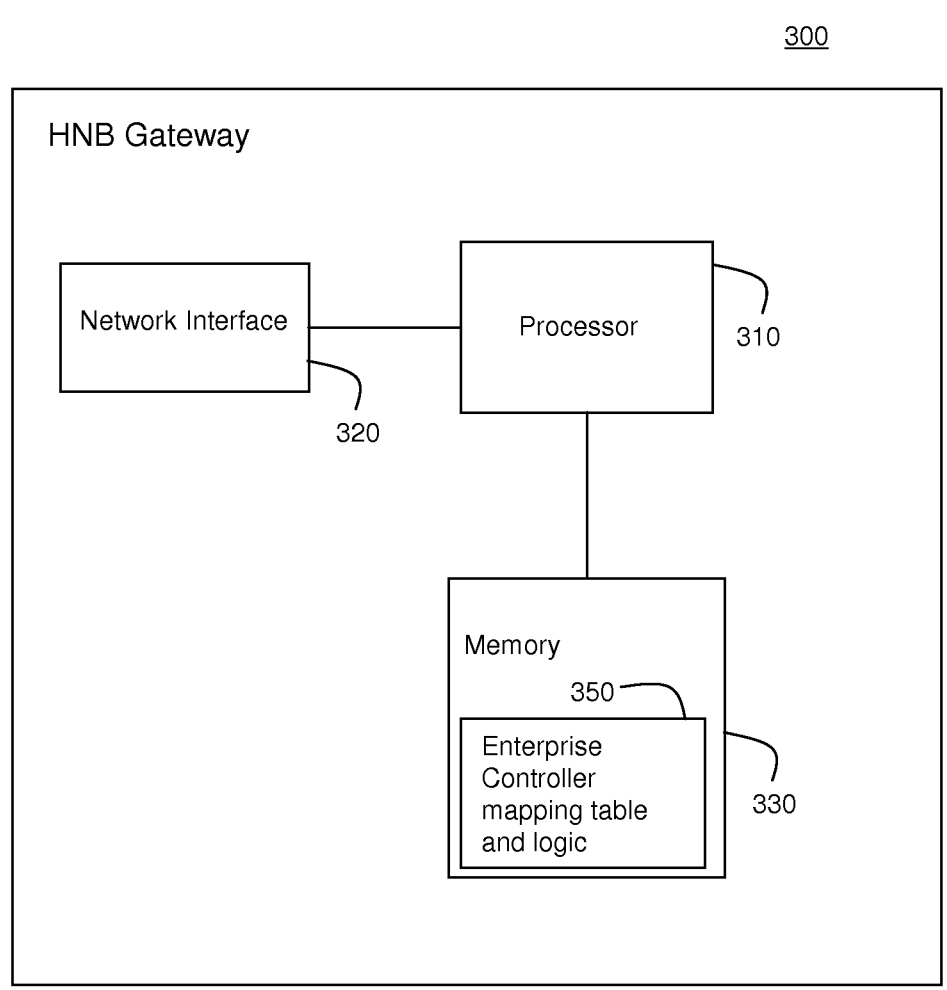
FIG. 3 is an example block diagram of a home node-B (HNB) gateway device configured with an enterprise controller mapping table and logic that is used to catalog enterprise controller devices that are serviced by the HNB gateway and to map aggregated messages to appropriate enterprise controller devices.

Turning to FIG. 3, an example block diagram of the HNB gateway 300 is shown. The HNB gateway 300 comprises a processor 310 which is coupled to a network interface device 320 and to a memory 330. The processor 310 of the HNB gateway 300 is configured to cause the network interface device 320 to transmit aggregated inbound messages destined for one or more of the UEs 102 to the enterprise controller device 200 in accordance with the Enterprise Controller mapping table and logic 350 described herein. The HNB gateway 300 may receive inbound messages destined for one or more of the UEs 102, for example, from the mobile switching center 112. After receiving the inbound message, the processor 310 may aggregate the inbound messages and may cause the network interface 320 to send a single aggregated message to the enterprise controller device 200. The processor 310 is also configured to cause the network interface device 320 to receive outbound messages (originating from one or more of the plurality of UEs 102) from the enterprise controller device 200, and upon receiving the outbound messages, the network interface device 320 is configured to transmit the outbound messages to the core network.

Figure 4:
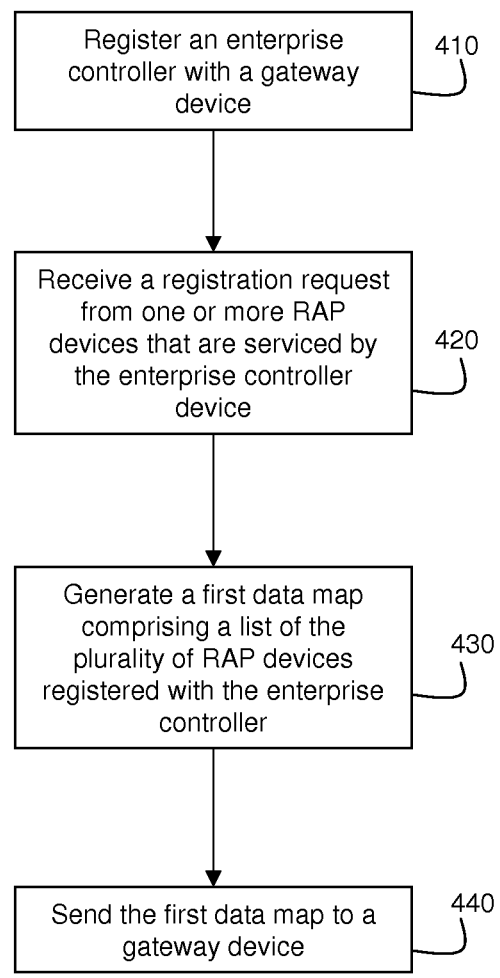
FIG. 4 is an example flow chart depicting how the RAP mapping table and logic in the enterprise controller device generates a data map to catalog the RAP devices serviced by the enterprise controller.

In general, the enterprise controller 200 is configured to manage or service one or more RAP devices 104 that are part of network 100. In one embodiment, the enterprise controller 200 may register with the HNB gateway device 300 to inform the HNB gateway 300 of the RAP devices 104 that it services. For example, after the enterprise controller 200 registers with the HNB gateway 300, the enterprise controller 200 may send a data map, in accordance with RAP mapping table and logic 400, to the HNB gateway 300 that identifies the RAP devices 104 that are managed by the enterprise controller 200. The HNB gateway 300 can then use this data map to send aggregated inbound messages to the enterprise controller 200, in accordance with the enterprise controller mapping table and logic 350. FIG. 4 shows an example flow chart depicting how the RAP mapping table and logic 400 in memory 230 of the enterprise controller 200 generates and sends this data map.

At step 410 in FIG. 4, the enterprise controller device 200 registers with the HNB gateway 300. This registration process is described in detail herein, particularly in connection with FIG. 5. When the enterprise controller 200 registers with the HNB gateway 300, the HNB gateway 300 is able to send appropriate inbound messages to the enterprise controller 200 and is able to receive outbound messages from the enterprise controller 200. After registering with the HNB gateway 300, at step 420, the enterprise controller 200 receives a registration request from one or more RAP devices 104. This registration process is described in detail herein, particularly in connection with FIGS. 6A and 6B. After receiving a registration request from one or more RAP devices 104, the processor 210, at step 430, generates a first data map comprising a list of the plurality of RAP devices 104 that have registered with the enterprise controller 200. For example, as shown below in Table 1, the first data map may identify enterprise controller 200 and the RAP devices (i.e., RAP 1, RAP 2 and RAP N) that have registered with the enterprise controller 200.

TABLE 1

Data map that identifies RAP devices managed by the enterprise controller device
Enterprise Controller 200

RAP 1
RAP 2
RAP N device

As more RAP devices register with the enterprise controller 200, the enterprise controller 200 may add those RAP devices to Table 1. Similarly, as RAP devices deregister with the enterprise controller (according to, for example, the techniques described in connection with FIGS. 7A and 7B), the enterprise controller 200 may remove those RAP device from Table 1.

At 440, logic 400 in combination with processor 210 of the enterprise controller 200 causes the first data map to be sent to the HNB gateway 300. For example, the data map in Table 1 may be periodically sent to the HNB gateway 300. Thus, the enterprise controller 200 and the HNB gateway 300 each have knowledge, by virtue of the first data map, of the plurality of RAPs 104 that are registered with the enterprise controller 200. The HNB gateway 300 can use this information to send an aggregated inbound message to the enterprise controller 200. The enterprise controller 200, upon receiving the aggregated message from the HNB gateway 300, can then map, replicate and send the message to the appropriate RAP devices 104 that service the UEs 102 for which the message is destined.

In some instances (e.g., paging messages) the HNB gateway 300 need only send one aggregated message, destined for one or more UEs 102, to the enterprise controller 200. For example, if the HNB gateway 300 receives an inbound message (e.g., from the mobile switching center 112) that is destined for UE devices camped on RAP 1 and RAP 2, the HNB gateway 300 can send a single aggregated message to the enterprise controller 200 instead of having to send individual messages to RAP 1 and RAP 2. The enterprise controller 200, upon receiving the aggregated message, can duplicate the message, map it to the appropriate RAP devices and send the message to each RAP device, based on techniques described herein. In one example, the HNB gateway 300 may send multicast messages to enterprise controller 200 destined for UEs based on multicast classifications or groups previously requested by UEs.

Figure 5:
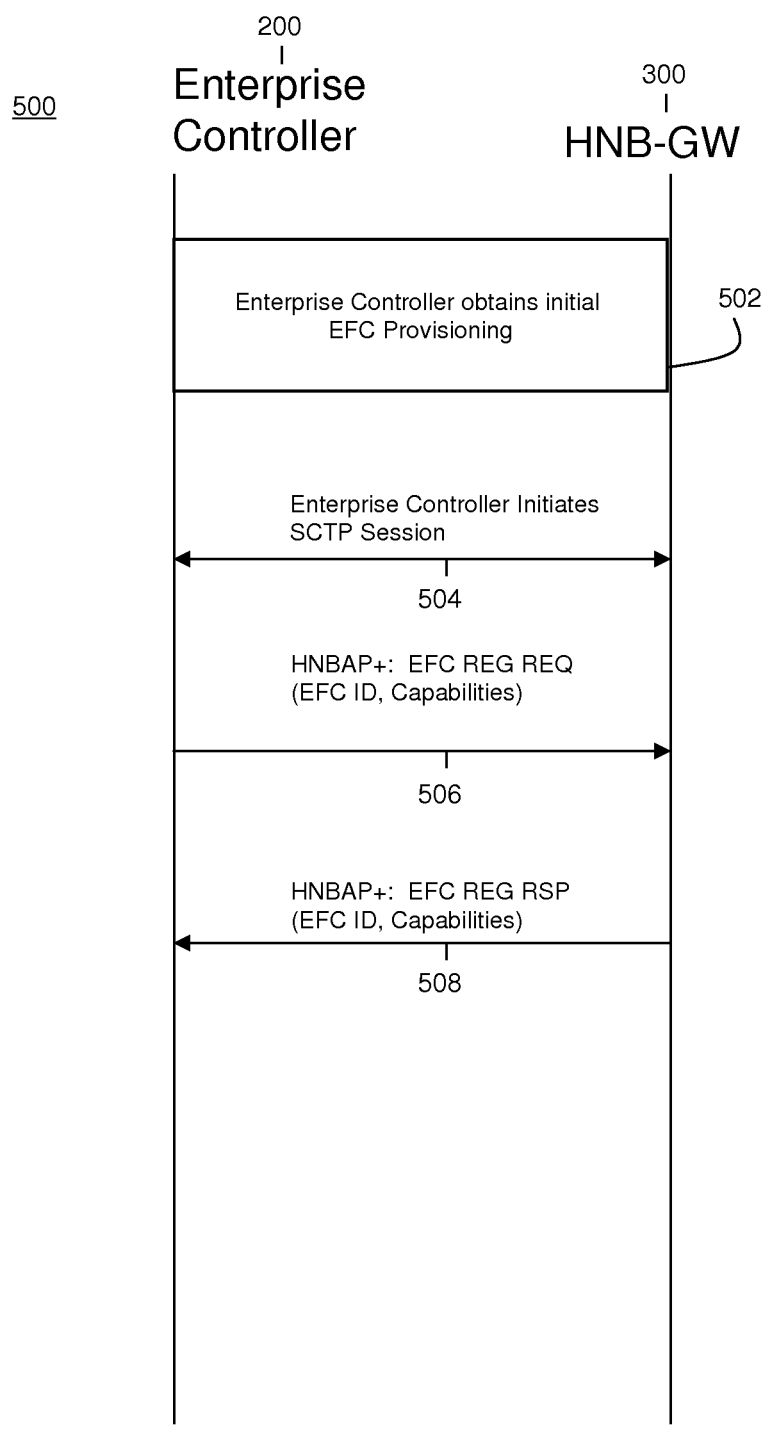
FIG. 5 shows a sequence diagram depicting steps for registering an enterprise controller device with the HNB gateway device.

Turning to FIG. 5, a sequence diagram is shown at 500 that depicts steps for registering the enterprise controller device 200 with the HNB gateway device 300. This registration process may be implemented using the framework defined by Technical Specification 25.469 of the 3$^{rd}$ Generation Partnership Project (3GPP) that defines the Home Node B Application Part (HNBAP) application protocol for signaling the enterprise controller device 200 and the HNB gateway device 300, where the HNB gateway 300 is ultimately in communication with macro service, such as cellular service. This protocol may also be used for signaling between HNB devices (e.g., a RAP devices 104 such as a femtocell or picocell) and the HNB gateway device 300 (as described in connection with FIGS. 6A and 6B and FIGS. 7A and 7B, herein).

At 502, the enterprise controller obtains initial enterprise controller (also referred to as an enterprise femto controller or "EFC") provisioning. This allows for the enterprise controller 200 to begin communications with the HNB gateway 300. At 504, the enterprise controller 200 initiates a stream control transmission protocol (SCTP) session between itself and the HNB gateway 300. The SCTP session allows secure data transfers between the enterprise controller 200 and the HNB gateway 300, though it should be appreciate that other protocols may be used for data transfer between the network components. At 506, the enterprise controller 200 sends a registration request to the HNB gateway 300. This registration request includes an enterprise controller identifier (shown as "EFC ID") that uniquely identifies enterprise controller 200 to the HNB gateway 300. The registration request also includes enterprise controller capabilities to provide for capabilities negotiation between the enterprise controller 200 and the HNB gateway 300. At 508, the HNB gateway 300 sends a response to the registration request to the enterprise controller 200 indicating that the enterprise controller 200 is registered with the HNB gateway 300. Thus, by registering with the HNB gateway 300, the enterprise controller 200 can be uniquely identified by the HNB gateway 300 (for example, by the EFC ID) and the enterprise controller 200 is able to send the first data map to the HNB gateway 300.

As stated above, the enterprise controller 200 manages RAP devices 104 that are part of network 100. The RAP devices may join network 100 by registering with the enterprise controller 200. RAP devices may also leave network 100 by deregistering with the enterprise controller 200. Thus, by registering and deregistering with the enterprise controller 200, the enterprise controller 200 is able to update and maintain the first data map (shown above in Table 1) to keep track of the RAP devices that the enterprise controller 200 manages.

Figure 6A:
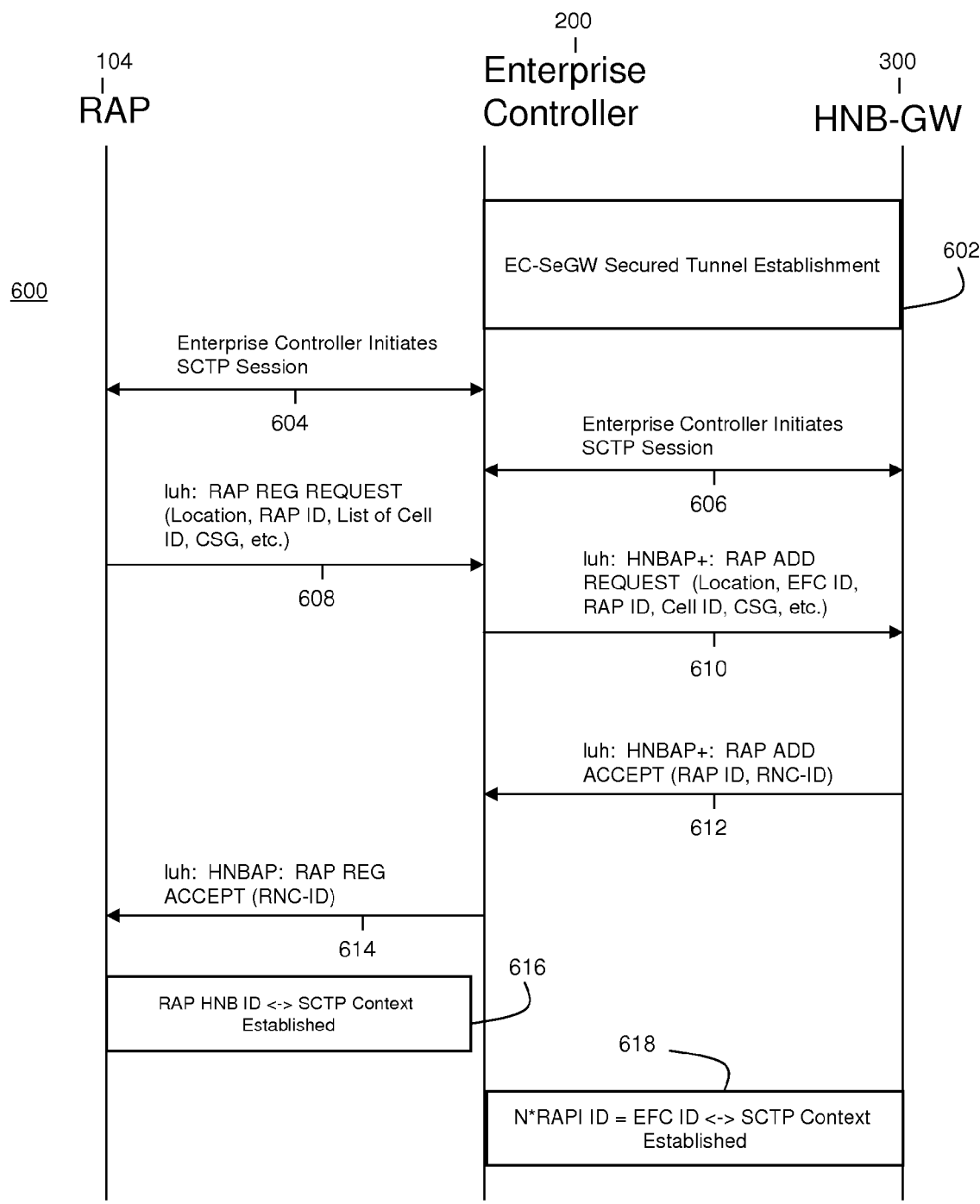
FIG. 6A shows an example of a sequence diagram depicting steps for registering RAP devices with the enterprise controller device.

FIGS. 6A and 6B are now described in connection with an example of a message sequence for registering RAP devices with the enterprise controller. FIG. 6A shows a sequence diagram depicting steps for registering a RAP device 104 with the enterprise controller 200. FIG. 6B shows a message received at HNB gateway 300 that comprises sub-messages to indicate that the RAP device 104 is registering with the enterprise controller 200. In general, in FIG. 6A, control messages may be sent between a RAP device 104, enterprise controller 200 and HNB gateway 300 in order to add the RAP device 104 to network 100. The operations shown in FIG. 6A result in message 620, shown in FIG. 6B, being sent from the enterprise controller 200 to the HNB gateway 300. Message 620 comprises sub-message 620(a) and sub-message 620(b). Sub-message 620(a) is initially transmitted between RAP device 104 and the enterprise controller 200 when the RAP device requests to register with the enterprise controller. The enterprise controller 200 subsequently adds sub-message 620(b) to sub-message 620(a) to create message 620, which is forwarded to the HNB gateway device. The RAP registration process, including transmitting sub-message 620(a) and 620(b), may occur as follows.

At 602 in FIG. 6A, an enterprise controller-secure gateway (EC-SeGW) tunnel is established for secure message exchanges between the enterprise controller device 200 and the HNB gateway device 300. In establishing the secure tunnel, Internet Protocol Security (IPSec) and Internet Key Exchange version 2 (IKEv2) protocols may be used for authentication and securing data exchanges between the enterprise controller device 200 and the HNB gateway device 300.

After the secure tunnel is established in 602, a RAP 104 can initiate, at 604, an SCTP session between the RAP 104 and the enterprise controller 200. Similarly, an SCTP session can be established, at 606, between the enterprise controller 200 and the HNB gateway 300.

At 608, RAP 104 sends a registration request message to enterprise controller 200. The registration request 608 may be sent over an Iu-h interface (herein "Iuh") that defines a security architecture to provide network communications. The registration request 608 may include sub-message 620(a) shown in FIG. 6B, which includes RAP identity information, RAP location information, Public Land Mobile Network (PLMN) identity for RAP 104, cell identity for RAP 104, location area code (LAC), routing area code (RAC), and service area code (SAC) for RAP 104, close subscriber group (CSG) information and cell access mode information of RAP 104.

Upon receiving the registration request 608 in FIG. 6A from RAP 104, the enterprise controller 200 registers RAP 104 and updates its first data map (for example, by adding RAP 104 to Table 1, above) to indicate that RAP 104 is now managed by enterprise controller 200. After updating its first data map, the enterprise controller 200, at 610, sends a RAP Add request to the HNB gateway 300 to register RAP 104. This RAP Add request contains additional fields such as those shown in sub-message 620(b) in FIG. 6B, and in particular includes the EFC ID that uniquely identifies enterprise controller 200 to the HNB gateway 300. Thus, the enterprise controller 200 passes message 620 (comprising sub-messages 620(a) and 620(b)) to the HNB gateway 300, which, in essence, allows the enterprise controller 200 to pass its updated first data map (e.g., Table 1 above) to HNB gateway 300 each time that a RAP device registers with the enterprise controller 200. That is, by receiving the EFC ID in sub-message 620(b) along with the RAP Add registration request in 620(a), the HNB gateway 300 receives knowledge that RAP 104 is serviced by the enterprise controller (i.e., that RAP 104 is "added" to Table 1).

After receiving the registration request 610 with message 620 shown in FIG. 6B, the HNB gateway 300, at 612 in FIG. 6A, sends an acknowledgement message to the enterprise controller 200 indicating that RAP 104 has been added with the HNB gateway 300. At 614, the enterprise controller 200 sends an acknowledgment message to RAP 104 indicating that RAP 104 has been registered with the enterprise controller 200. At 616, a context identifier is created by the enterprise controller 200 that associates the RAP 104 with enterprise controller 200, and at 618, a context identifier is created by the HNB gateway 300 that associates the enterprise controller 200 and the newly added RAP device 104 with the HNB gateway 300.

As stated above, RAP devices 104 may leave network 100 by deregistering from enterprise controller 200. For example, some of the RAP devices 104 may control or manage multiple UE devices 102, while other RAP devices may control or manage few or no UE devices 102. Thus, lightly used, unused or non-operational RAP devices may need to deregister from the enterprise controller 200 and the HNB gateway 300.

Figure 7A:
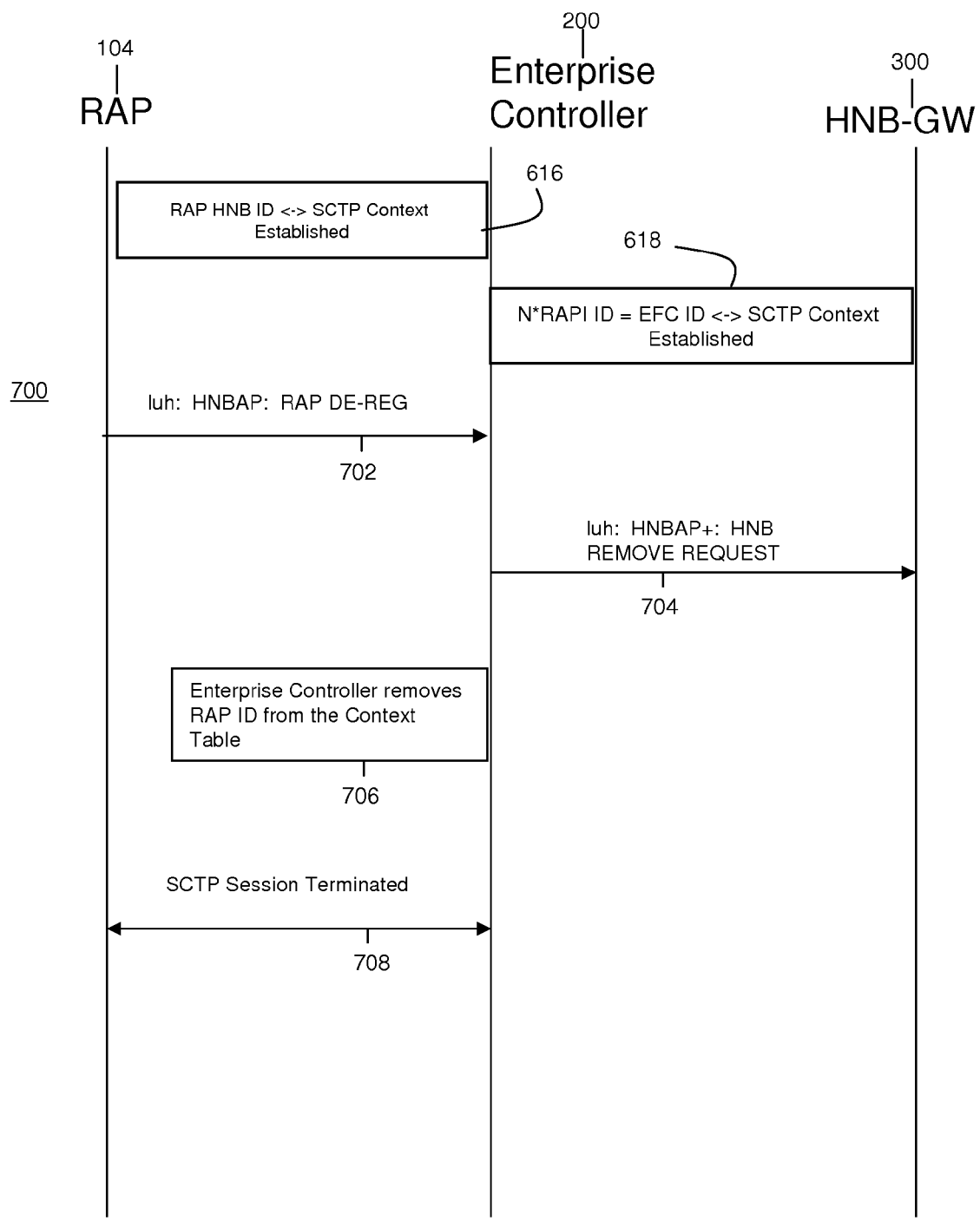
FIG. 7A shows an example of a sequence diagram depicting steps for deregistering RAP devices from the enterprise controller device.
Figure 7B:
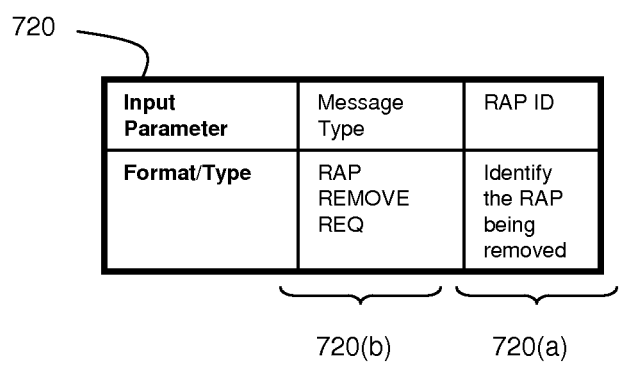
FIG. 7B shows an example of a message received at the HNB gateway device that identifies the RAP devices that are being deregistered from the enterprise controller device.

FIGS. 7A and 7B are now described for a message sequence for deregistering RAP devices from the enterprise controller. FIG. 7A shows a sequence diagram depicting steps for deregistering a RAP device from network 100. FIG. 7B shows a message received at the HNB gateway 300 that comprises sub-messages to indicate that the RAP device 104 is deregistering from the enterprise controller 200. In general, the operations shown in FIG. 7A result in message 720, shown in FIG. 7B, to be sent to the HNB gateway. Message 720 comprises sub-message 720(a) and sub-message 720(b). Sub-message 720(a) is initially transmitted between RAP device 104 and the enterprise controller 200 when the RAP device requests to deregister from the enterprise controller. The enterprise controller 200 subsequently adds sub-message 720(b) to sub-message 720(a) to create message 720, which is forwarded to the HNB gateway device. The steps for deregistering the RAP device, including sending sub-messages 720(a) and 720(b), may occur as follows.

In FIG. 7A, the context identifier, as described above, that associates the RAP 104 with the enterprise controller 200 is shown at reference numeral 616 and the context identifier, as described above, that associates the enterprise controller 200 and RAP 104 with the HNB gateway 300 is shown at 618. At 702, RAP 104 (which is to be deregistered from network 100) sends a deregistration request to enterprise controller 200. As is the case with the registration message exchange, above, the deregistration request may be sent over an Iuh interface. The deregistration request 702 may contain RAP identity information, as shown in sub-message 720(a) in FIG. 7B, to identify the particular RAP that is deregistering from the enterprise controller 200. Upon receiving the deregistration request 702, the enterprise controller 200 deregisters RAP 104 and updates its first data map to indicate that RAP 104 is no longer managed by enterprise controller 200. After updating its first data map, the enterprise controller 200, at 704, sends a remove request, shown by sub-message 720(b) in FIG. 7B, in addition to the RAP identity information contained in sub-message 720(*a*), to the HNB gateway 300 to deregister RAP 104. Thus, the enterprise controller 200 passes message 720 (comprising sub-messages 720(*a*) and 720(*b*)) to the HNB gateway 300, which, in essence, allows the enterprise controller 200 to pass the updated deregistration information along to HNB gateway 300. Thus, by virtue of receiving message 720 from the enterprise controller 200, the HNB gateway 300 receives an updated first data map indicating that RAP 104 has deregistered from enterprise controller 200.

After sending the remove request 704 containing message 720 in FIG. 7B, the enterprise controller 200, at 706 in FIG. 7A, removes context identifier 616 from a data map that contains a list of context identifiers associated with RAP devices registered with the enterprise controller 200. At 708, the enterprise controller 200 terminates the SCTP session between the now deregistered RAP 104 and the enterprise controller 200.

Figure 8:
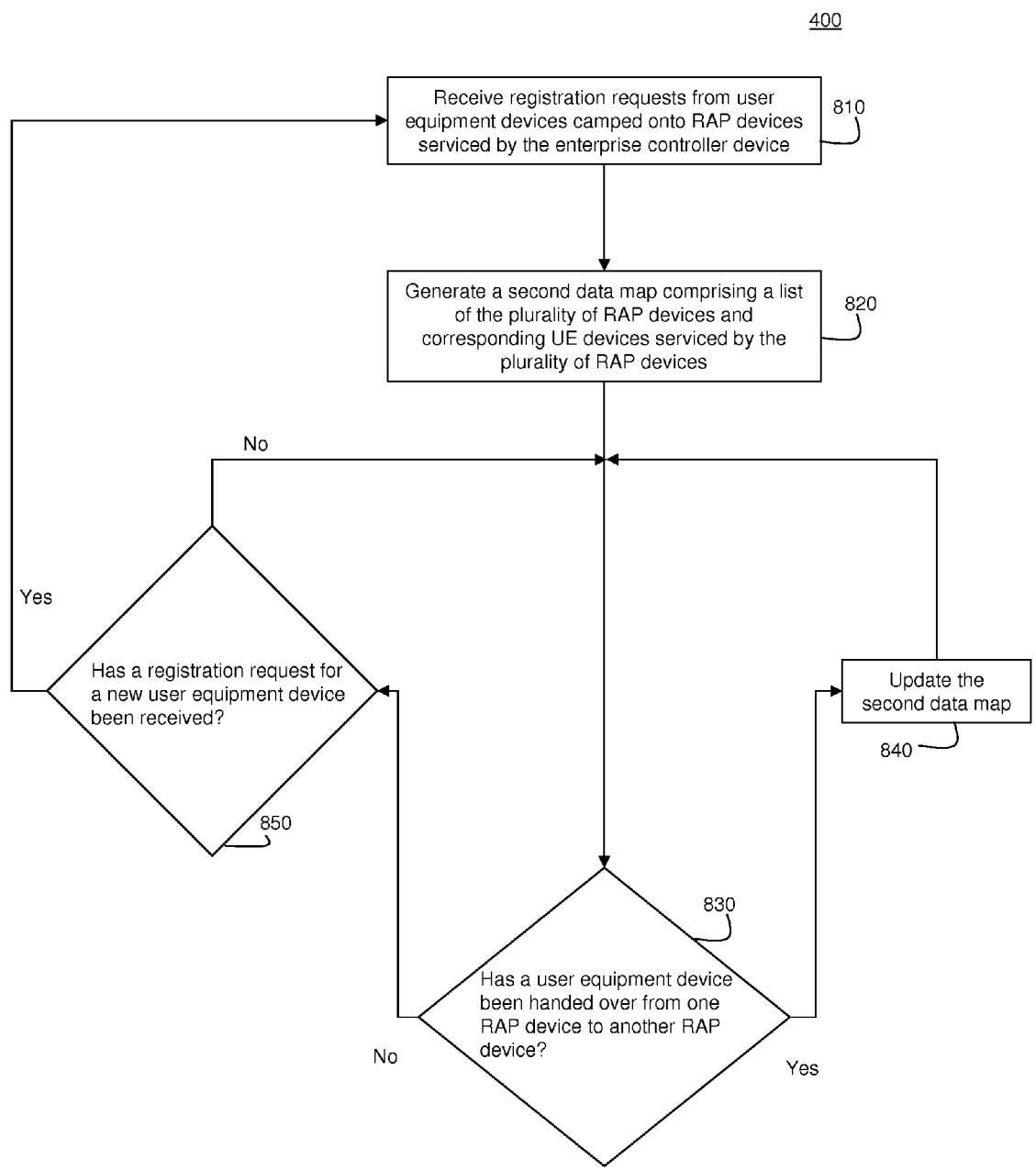
FIG. 8 is an example flow chart depicting how the RAP mapping table and logic in the enterprise controller device generates a data map to catalog a plurality of user equipment (UE) devices that are managed by each of the RAP devices serviced by the enterprise controller.

After the RAP devices 104 register with the enterprise controller 200 (for example, by the techniques described above in connection with FIGS. 6A and 6B), UE devices 102 may join network 100 by camping onto one of the registered RAP devices. When a UE device 102 camps onto a RAP device 104 (i.e., sends a request to HNB gateway 300 to register with a RAP), the HNB gateway 300 may assign a context identifier to the UE device 102 that associates that UE device 102 with the RAP device 104 that it has camped onto. Since messaging passes through enterprise controller 200, enterprise controller 200 is also aware of this context identifier. Thus, this context identifier allows for both the enterprise controller 200 and the HNB gateway 300 to know which RAP device 104 that the UE device 102 has camped onto. Based on this information, the RAP mapping table and logic 400 stored in memory 230 of enterprise controller 200 can generate and maintain a second data map to keep track of the RAP devices that manage each UE device. FIG. 8 shows an example flow chart depicting how the RAP mapping table and logic 400 generates and maintains this data map.

At step 810 in FIG. 8, the enterprise controller 200 receives registration requests from user equipment devices 102 that are camped onto RAP devices 104 serviced by the enterprise controller 200. After receiving the registration requests, at step 820, the processor 210 generates a second data map comprising a list of the plurality of RAP devices 104 and their corresponding UE devices 102. This is shown in Table 2, below.

TABLE 2

| Data map that identifies the RAP devices that manage each UE device | |
|---|---|
| RAP devices | UE devices |
| RAP 1 | UE 1 |
| RAP 2 | UE 2 |
| RAP N | UE K |

Table 2 shows UE 1 as being camped onto RAP 1, UE 2 as being camped onto RAP 2, and UE K being camped onto RAP N. As stated above, however, the UE devices 102 can roam (i.e., be "handed over") between the RAP devices 104. In other words, when the UE devices 102 are handed over, they camp onto new RAP devices. Step 830 in FIG. 8 determines whether a UE device has been handed over from one RAP device to another RAP device. If a UE device has been handed over, the processor 210, at 840, updates the second map by, for example, updating Table 2 to reflect the new RAP device with which the UE is associated. If a UE device has not been handed over, the processor, at 850, determines whether a registration request for a new UE device has been received by the enterprise controller 200. If a registration request for a new UE device has been received, the RAP mapping table and logic 400 reverts to step 810. If a registration request for a new UE device has not been received, the RAP mapping table and logic 400 reverts to step 830 to determine if a UE device has been handed over. Thus, by the processes described in FIG. 8, the enterprise controller 400 is able to maintain a second data map to keep track of the RAP devices 104 with which the UE devices 102 are registered.

Figure 9:
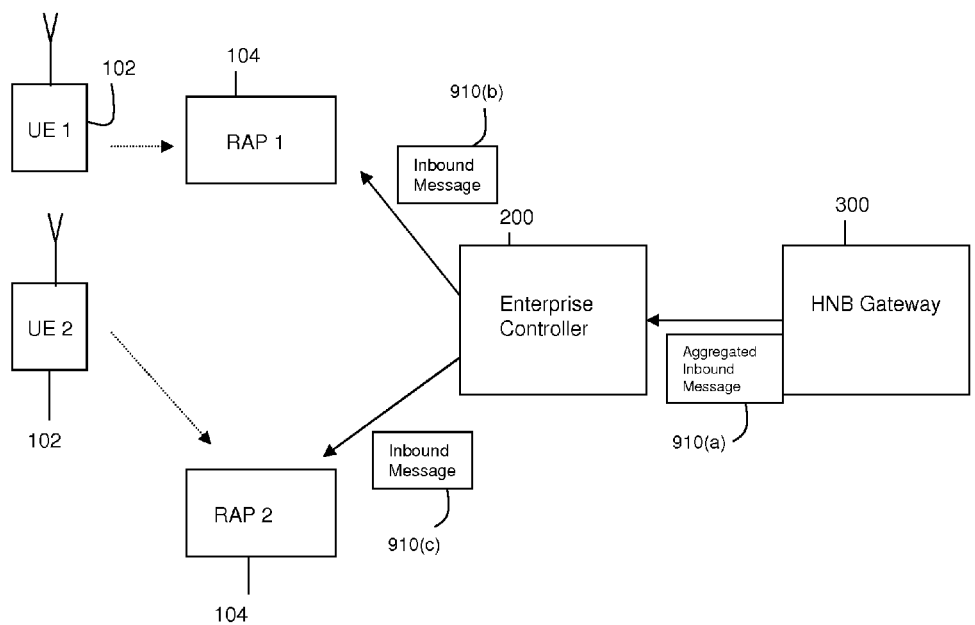
FIG. 9 is an example block diagram showing inbound messages being sent in an aggregated manner from the gateway device to the enterprise controller device.

The second data map allows for the enterprise controller 200 to map aggregated messages received from the HNB gateway 300 to the appropriate RAP devices 104 that service the UE devices 102 for which the messages are destined. For example, FIG. 9 shows a block diagram displaying aggregated inbound messages being sent from the HNB gateway 300 to the enterprise controller 200. In FIG. 9, enterprise controller 200 receives a single aggregated inbound message 910(*a*) that is destined for UE 1 and UE 2 from the HNB gateway 300. The enterprise controller 200 maps the received message 910(*a*) to the appropriate RAP device (i.e., RAP 1 and RAP 2) by using the second data map. The enterprise controller 200 then duplicates the received message 910(*a*) into messages 910(*b*) and 910(*c*) and sends messages 910(*b*) and 910(*c*) to RAP 1 and RAP 2, respectively.

As described above, in one embodiment, by receiving the first data map from the enterprise controller 200 during the registration processes, the HNB gateway 300 has knowledge of the RAP devices 104 that the enterprise controller 200 manages. Accordingly, the enterprise controller mapping table and logic 350 stored in memory 330 of the HNB gateway 300 may cause the HNB gateway 300 to map and send aggregated inbound messages destined for one or more UE devices to the appropriate enterprise controller device (i.e., enterprise controller 200) based on information in the first data map.

In another embodiment, however, the enterprise controller 200 might not register with the HNB gateway 300. Thus, in this example, the HNB gateway 300 may not have knowledge of the RAP devices 104 that the enterprise controller 200 manages or even that such an enterprise controller 200 exists at all. Instead, the enterprise controller 200 may signal to the HNB gateway 300 that all of the UE devices 102 that are managed by RAP devices serviced by the enterprise controller 200 are registered or relocated to a single RAP device (which may actually be the enterprise controller 200 itself or any RAP device 104). Thus, in this embodiment, the HNB gateway 300 believes that all of the UE devices 102 are relocated to the single RAP device, and accordingly, the HNB gateway 300 may send only one aggregated message to the single RAP device, which may be the enterprise controller 200. This example is described in connection with FIG. 10 and FIG. 11, below.

Figure 10:
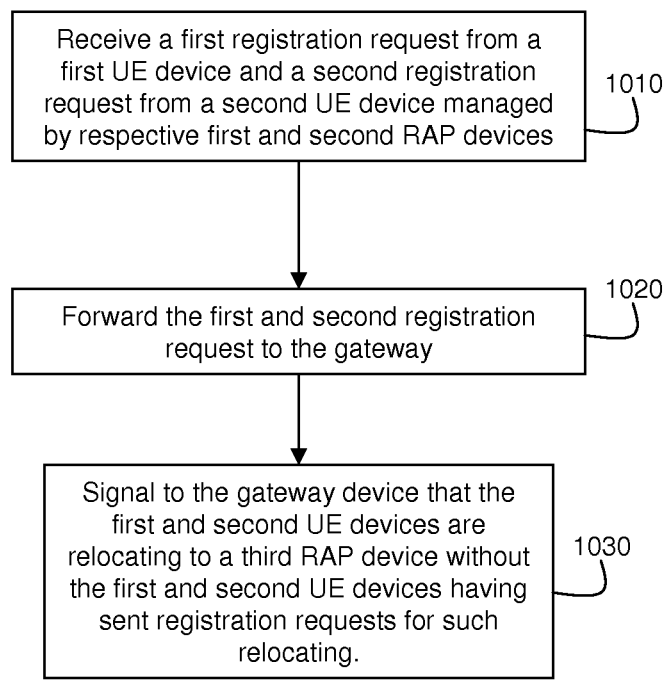
FIG. 10 is an example flow chart depicting how the RAP table and mapping logic in the enterprise controller device causes the HNB gateway device to perceive that UE devices are located on a single RAP device.

FIG. 10 is a flow chart that depicts how the RAP table and mapping logic 400 in the enterprise controller causes the HNB gateway 300 to perceive that all of the UE devices are located on a single RAP device. At 1010, the enterprise controller 200 receives a first registration request from a first UE device and a second registration request from a second UE device managed by first and second RAP devices. At 1020, processor 210 of the enterprise controller 200 forwards the first and second registration request to the HNB gateway 300. At 1030, processor 210 causes the enterprise controller 200 to signal to the HNB gateway 300 that the first and second UE devices are relocating to a third (single) RAP device without the first and second UE devices having sent registration requests for such relocating. Thus, the HNB gateway device 300 will thereafter effectively send aggregated inbound messages to the third RAP device (e.g., the enterprise controller 200) that are destined for the first and second UE device. The enterprise controller 200, by virtue of maintaining the second data map, described above, can then map and send the received aggregated message to the appropriate RAP devices that actually manages the first and second UE device.

The third RAP device to which the UEs are "relocated" may actually be a virtual RAP device. FIG. 11 is a sequence diagram depicting steps for relocating UEs 102 to such a "virtual" RAP device. The message shown at reference numeral 1105 depicts a standard inbound message originating from the core network (as described above) 1110 destined for a UE 102 that is registered with a RAP device 104. At 1115, the enterprise controller device 200 decides to relocate UE 102 to a virtual RAP device. As stated above, the virtual RAP device may be any RAP device 104 in network 100 or may be the enterprise controller 200 itself. For simplicity, FIG. 11 shows the enterprise controller 200 operating as the virtual RAP device.

After deciding to relocate UE 102 to a virtual RAP, the enterprise controller 200, at 1120, changes the original context identifier of the inbound message 1105 associated with UE 102 to a local context identifier. At 1130, the enterprise controller 200 sends a registration request to the HNB gateway 300 for UE 102 to be registered with the virtual RAP, and at 1140, HNB gateway 300 accepts the registration request and assigns a context identifier associating UE 102 with the virtual RAP. It should be noted that even though the HNB gateway 300 assigns the context identifier in step 1140, enterprise controller 200 may also store the local context identifier generated in step 1120 to maintain and update the second data map. For example, the enterprise controller 200 may change the context identifier assigned by the HNB gateway 300 to the local context identifier to map the message to the appropriate RAP device.

At 1150, the enterprise controller 200 sends a deregistration request to the HNB gateway 300 for UE 102 to be deregistered from RAP 104. At 1160, UE 102 sends a location registration request to the enterprise controller 200 to register its location on RAP 104. Upon receiving this location registration request, the enterprise controller 200, at 1170, changes the location area code (LAC) associated with UE 102 and RAP 104 to a LAC associated with UE 102 and the virtual RAP (e.g., V-RAP LAC). This provides the enterprise controller 200 with another mechanism to maintain the second data map. The location registration, with the LAC associated with UE 102 and the virtual RAP, is then sent, at 1180, to the core network 1110. Thus, the core network 1110 perceives UE 102 to be camped onto the virtual RAP, while the enterprise controller 200 maintains a data map (i.e., the second data map, described above) that associates UE 102 with RAP 104. The enterprise controller 200, thus, is able to map aggregated messages received from the HNB gateway 300 to appropriate RAP devices that manage UE devices for which the message is destined using the second data map, as described above.

The enterprise controller 200 can utilize the LAC information to manage inbound messages destined for the UEs and outbound messages originating from the UEs. For example, inbound messages may be sent directly to a RAP from the HNB gateway 300 based on the LAC that is associated with the RAP. Since the HNB gateway 300 may perceive UE 102 to be located on the single (virtual) RAP device, the HNB gateway 300 may send an aggregated inbound message (e.g., a paging message) destined for one or more UE device directly to the single RAP device based on the V-RAP LAC information. The enterprise controller 200, having knowledge of the LAC information associated with RAP 104, can then map the inbound message received at the single RAP device to RAP 104 by mapping the V-RAP LAC to the appropriate LAC associated with RAP 104. In one example, these techniques may allow for the HNB gateway 300 to send multicast messages directly to the single RAP device destined for UEs based on multicast classifications or groups previously requested by UEs, whereupon the enterprise controller 200 may duplicate and map the messages to the appropriate RAP device.

Similarly, outbound messages may be sent directly from a RAP to the HNB gateway 300 using V-RAP LAC information that masks the true LAC of the actual RAP on which the UE is camped.

It should be appreciated that processor 210 of the enterprise controller 200 and processor 310 of the HNB gateway 300 are microprocessors or microcontrollers that are configured to execute program logic instructions (i.e., software) for carrying out various operations and tasks described herein. For example, the processor 210 is configured to execute RAP mapping table and logic 400 that is stored in memory 230 in order to map inbound messages to appropriate operational RAP devices 104 that service UEs 102, and the processor 310 is configured to execute enterprise controller mapping table and logic 350 stored in memory 330 to map inbound messages to appropriate enterprise controller devices 200 that service operational RAP devices 104. Memory 230 and 330 may comprise read only memory (ROM), random access memory (RAM), magnetic disk storage media devices, optical storage media devices, flash memory devices, electrical, optical, acoustical or other physical/tangible memory storage devices.

The functions of processor 210 and processor 310 may be implemented by logic encoded in one or more tangible computer readable media (e.g., embedded logic such as an application specific integrated circuit, digital signal processor instructions, software that is executed by a processor, etc), wherein memory 230 and memory 330 store data used for the operations described herein and stores software or processor executable instructions that are executed to carry out the operations described herein.

The RAP mapping table and logic 400 and enterprise controller mapping table and logic 350 may take any of a variety of forms, so as to be encoded in one or more tangible computer readable memory media or storage device for execution, such as fixed logic or programmable logic (e.g., software/computer instructions executed by a processor) and processors 210 and 310 may be application specific integrated circuits (ASIC) that comprises fixed digital logic, or a combination thereof. For example, the processor 210 and processor 310 may be embodied by digital logic gates in a fixed or programmable digital logic integrated circuit, which digital logic gates are configured to perform the RAP mapping table and logic 400 and the enterprise controller mapping table and logic 350, respectively. In another form, the RAP mapping table and logic 400 and the enterprise controller mapping table and logic 350 may be embodied in one or more computer readable storage media encoded with software comprising computer executable instructions and when the software is executed operable to perform the operations described herein.

It should be appreciated that the techniques described above in connection with all embodiments may be performed by one or more computer readable storage media that is encoded with software comprising computer executable instructions to perform the methods and steps described herein.

In sum, a method is provided to register an enterprise controller device with a gateway device, to receive at the enterprise controller device a registration request from a first radio access point (RAP) device and a second RAP device, wherein the first RAP device and the second RAP device are serviced by the enterprise controller device, to generate at the enterprise controller device a first data map that comprises a list of the first and second RAP devices registered with the enterprise controller, and to send the first data map from the enterprise controller device to the gateway device.

In addition, a method is provided at an enterprise controller device for receiving a first registration request from a first UE device and a second registration request from a second UE device managed by respective first and second RAP devices, forwarding the first and second registration request to a gateway device, and thereafter signaling to the gateway device that the first and second UE devices are relocating to a third RAP device without the first and second UE devices having sent registration requests for such relocating.

Further, a method is provided at a gateway device to receive a registration request from one or more enterprise controller devices that are serviced by the gateway device and to receive a data map from each of the one or more enterprise controller devices that are serviced by the gateway device, wherein the data map comprises a list of radio access point (RAP) devices that are serviced by the enterprise controller device.

In addition, an apparatus is provided comprising a network interface device, a memory and a processor unit coupled to the network interface device and the memory, and configured to register the apparatus with a gateway device, receive a registration request from a first radio access point (RAP) device and a second RAP device, wherein the first RAP device and the second RAP device are serviced by the apparatus, generate a first data map that comprises a list of the first and second RAP devices registered with the apparatus, store the first data map in the memory, and send the first data map from the apparatus to the gateway device.

The above description is intended by way of example only. Various modifications and structural changes may be made therein without departing from the scope of the concepts described herein and within the scope and range of equivalents of the claims.

The invention claimed is:

1. A method comprising:
registering an enterprise controller device with a gateway device;
at the enterprise controller device, receiving a registration request from each of a first radio access point (RAP) device and a second RAP device, wherein the first RAP device and the second RAP device are serviced by the enterprise controller device;
at the enterprise controller device, generating a first data map that comprises a list of the first and second RAP devices registered with and serviced by the enterprise controller;
sending the first data map from the enterprise controller device to the gateway device such that the gateway device is provided with a list of RAP devices that are registered with and serviced by the enterprise controller device to enable the enterprise controller to receive from the gateway device a single message that is destined for the first and second RAP devices;
at the enterprise controller device, registering a first user equipment (UE) device with the first RAP device serviced by the enterprise controller device and registering a second UE device with the second RAP device serviced by the enterprise controller device; and
at the enterprise controller device, generating a second data map that comprises a list of the first and second RAP devices and corresponding first and second UE devices serviced by the plurality of RAP devices;
at the enterprise controller device, receiving a message destined for the first or second UE devices from the gateway device;
at the enterprise controller device, mapping the received message to appropriate RAP devices associated with the first and second UE devices by using the second data map stored in a memory of the enterprise controller; and
sending the message from the enterprise controller to the appropriate RAP devices based on the second data map.

2. The method of claim 1, wherein registering comprises registering the enterprise controller with the gateway such that the gateway uniquely identifies the enterprise controller by using enterprise controller ID information associated with the enterprise controller.

3. The method of claim 1, wherein sending the first data map comprises sending the first data map when the enterprise controller device registers with the gateway device.

4. The method of claim 1, further comprising updating the second data map when the first UE device is handed over from the first RAP device to a third RAP device.

5. The method of claim 1, wherein:
receiving the message comprises receiving a single message that is destined for both the first and the second UE devices; and
mapping comprises mapping the received single message to both the first and second RAP device associated with the first and second UE devices by using the second data map.

6. The method of claim 1, wherein receiving comprises receiving multicast messages destined for both the first and the second UE devices based on multicast classifications previously requested by the first and the second UE devices.

7. The method of claim 1, wherein mapping comprises mapping the received message to the appropriate RAP devices by mapping the received message to context identifiers that are associated with the first and second RAP devices that manage the first and second UE devices, respectively.

8. An apparatus comprising:
a network interface device;
a memory; and
a processor unit coupled to the network interface device and the memory, and configured to:
register the apparatus with a gateway device;
receive a registration request from a first radio access point (RAP) device and a second RAP device to be serviced by the apparatus;
generate a first data map that comprises a list of the first and second RAP devices registered with and serviced by the apparatus;
store the first data map in the memory;
send the first data map from the apparatus to the gateway device such that the gateway device is provided with a list of RAP devices that are registered with and serviced by the enterprise controller device to enable the enterprise controller to receive from the gateway device a single message that is destined for the first and second RAP devices, register a first UE device with the first RAP device serviced by the apparatus and a second UE device with the second RAP device serviced by the apparatus;

generate a second data map that comprises a list of the first and second RAP devices and corresponding first and second UE devices serviced by the plurality of RAP devices; and store the second data map in the memory, and map a message received at the network interface device from the gateway device that is destined for the first or second UE devices to appropriate RAP devices associated with the first and second UE devices by using the second data map stored in the memory; and send the message to the appropriate RAP devices based on the second data map.

9. The apparatus of claim 8, wherein the processor is further configured to map a single message received at the network interface device that is destined for both the first and second UE device to the appropriate RAP device associated with the first and second UE devices by using the second data map.

10. The apparatus of claim 8, wherein the processor is further configured to map the received message to the appropriate RAP devices by mapping the received message to context identifiers that are associated with the first and second RAP devices that manage the first and second UE devices, respectively.

11. One or more non-transitory computer readable storage media encoded with software comprising computer executable instructions and when the software is executed operable to:

register an enterprise controller device with a gateway device;

receive a registration request from each of a first radio access point (RAP) device and a second RAP device, wherein the first RAP device and the second RAP device are serviced by the enterprise controller device;

generate a first data map that comprises a list of the first and second RAP devices registered with and serviced by the enterprise controller;

send the first data map from the enterprise controller device to the gateway device such that the gateway device is provided with a list of RAP devices that are registered with and serviced by the enterprise controller device to enable the enterprise controller to receive from the gateway device a single message that is destined for the first and second RAP devices, register a first user equipment (UE) device with the first RAP device serviced by the enterprise controller device and registering a second UE device with the second RAP device serviced by the enterprise controller device;

generate a second data map that comprises a list of the first and second RAP devices and corresponding first and second UE devices serviced by the plurality of RAP devices;

receive a message destined for the first or second UE devices from the gateway device;

map the received message to appropriate RAP devices associated with the first and second UE devices by using the second data map stored in a memory of the enterprise controller; and send the message from the enterprise controller to the appropriate RAP devices based on the second data map.

12. The non-transitory computer readable storage media of claim 11, wherein the instructions operable to register comprise instructions operable to register the enterprise controller with the gateway such that the gateway uniquely identifies the enterprise controller by using enterprise controller ID information associated with the enterprise controller.

13. The non-transitory computer readable storage media of claim 11, wherein the instructions operable to send comprise instructions operable to send the first data map when the enterprise controller device registers with the gateway device.

14. The non-transitory computer readable storage media of claim 11, further comprising instructions operable to update the second data map when the first UE device is handed over from the first RAP device to a third RAP device.

15. The non-transitory computer readable storage media of claim 11, wherein the instructions operable to receive comprise instructions operable to receive a single message that is destined for both the first and the second UE devices and wherein the instructions operable to map comprise instructions operable to map the received single message to both the first and second RAP device associated with the first and second UE devices by using the second data map.

16. The non-transitory computer readable storage media of claim 11, wherein the instructions operable to receive comprise instructions operable to receive multicast messages destined for both the first and the second UE devices based on multicast classifications previously requested by the first and the second UE devices.

17. The non-transitory computer readable storage media of claim 11, wherein the instructions operable to map comprise instructions operable to map the received message to the appropriate RAP devices by mapping the received message to context identifiers that are associated with the first and second RAP devices that manage the first and second UE devices, respectively.

* * * * *